Patented Jan. 30, 1951

2,539,493

UNITED STATES PATENT OFFICE 2,539,493

1,2-DITHIOCYANOETHYL NAPHTHALENE

Eldon E. Stahly, Pittsburgh, Pa., assignor to Koppers Company, Inc., Pittsburgh, Pa., a corporation of Delaware No Drawing. Application January 25, 1947,
Serial No. 724,464

3 Claims. (Cl. 260—454)

This invention relates to methods and compositions and is particularly directed to 1,2-dithiocyanoethyl naphthalenes as new compounds and their manufacture.

The novel compounds of the invention are dithiocyanates of vinyl naphthalene. They are prepared by reacting the vinyl naphthalene with nascent thiocyanogen as obtained for example by the action of copper sulphate on sodium thiocyanate. By this reaction two thiocyanate groups are added to the double bond of the vinyl group to form a 1,2-dithiocyanoethyl naphthalene.

The invention may be more fully understood by reference to the following example in which the parts are by weight unless otherwise specified and are in the cgs system.

EXAMPLE I

*Beta (1,2-dithiocyanoethyl) naphthalene (beta naphthethylene dithiocyanate)*

While agitating a mixture of 162 parts of sodium thiocyanate and 38.5 parts of beta-vinylnaphthalene and 400 volume parts of 95 per cent ethanol, there was added dropwise over a period of 72 minutes a solution of 175 parts of copper sulfate pentahydrate in 400 volume parts of water. At the start of the addition the reactor contents were at 26° C. and the copper sulfate solution was at 60° C. At the end of the addition the reactor contents were at 41° C. and the last of the copper sulfate was at 40° C. The maximum reaction temperature was 43° C. reached 40 minutes after the start of the reaction. No external source of heat was employed; the temperature rise was due to a combination of reaction heat and the initial temperature of the copper sulfate solution. The initial dark-brown color of the cupric thiocyanate gradually changed to a yellow color during the course of the addition. The yellow color is presumably that of cuprous thiocyanate which results simultaneously with the release of nascent thiocyanogen from the cupric salt. Stirring was continued for about an hour and 50 minutes after the addition of copper sulfate was complete. The final temperature was 35° C. The final reaction product consisted of the yellow solid sodium thiocyanate, the dicyanoethylnaphthalene, the aqueous alcohol solution, and solid by-products both dissolved and suspended in the solution.

The total mixture was extracted by stirring with 350 volume parts benzene, filtering and separating the upper benzene layer from the filtrate. The aqueous layer of the filtrate was extracted twice more with 200 volume parts portion of benzene and the solid residue was extracted once by agitating with 500 volume parts portion of benzene. The combined benzene extracts were evaporated in vacuo to yield 35 parts light yellow crystals melting at 128–132° C. Further extraction of the solid residue (CuSCN, etc.) was found necessary due to a limited solubility of the dithiocyanoethylnaphthalene in benzene. By four more extractions of the solid thiocyanate residue and evaporation of the combined benzene solutions in vacuo about 21 parts of a white crystalline powder were obtained (melting point 125° to 135° C.). The analyses indicated the crude products to be about 95 per cent pure beta - (1,2 - dithiocyanoethyl) naphthalene. A few parts were crystallized from 100 volume parts of ethyl alcohol-petroleum ether mixture to give white crystals melting at 135–135.5° C. The analysis of these purified crystals showed 23.43 per cent sulfur and 10.11 per cent nitrogen (theoretical values are 23.72 per cent sulfur and 10.36 per cent nitrogen).

In place of beta-vinyl naphthalene there may be substituted alpha-vinyl naphthalene in which case the product is alpha-(1,2-dithiocyanoethyl) naphthalene or there may be substituted a mixture of beta and vinyl naphthalenes. One or more of the vinyl group hydrogens may be replaced by indifferent substituents such as alkyl as typified by alpha methylvinylnaphthalene. Also one or more of the nuclear hydrogens may be replaced by indifferent substituents such as alkyl, chlorine or nitro groups. By indifferent substituents I mean substituents which do not react with nascent thiocyanogen under the conditions of the dithiocyanation.

The compounds of the invention are useful as active ingredients in insecticidal and pharmaceutical compounds, as intermediates for preparation of disulfides for the same purposes, and as intermediates in preparation of disulfonic acids useful in the field of soaps and detergents. They may be isomerized to diisothiocyanates by heat, and the diisothiocyanates in turn may be reduced to diamino derivatives, etc.

This application is in part a continuation of my copending application, Serial Number 637,764, filed December 28, 1945, now Patent No. 2,530,408.

I claim:
1. 1,2-dithiocyanoethyl naphthalene.
2. Beta (1,2-dithiocyanoethyl) naphthalene.
3. Alpha (1,2-dithiocyanoethyl) naphthalene.

ELDON E. STAHLY.

(References on following page)

REFERENCES CITED

The following references are of record in the file of this patent:

UNITED STATES PATENTS

| Number | Name | Date |
|---|---|---|
| 1,790,097 | Kaufmann | Jan. 27, 1931 |
| 2,188,495 | Borglin | Jan. 30, 1940 |
| 2,286,222 | Moyle et al. | June 16, 1942 |
| 2,342,448 | Bousquet | Feb. 22, 1944 |
| 2,438,751 | Jones | Mar. 30, 1948 |

FOREIGN PATENTS

| Number | Country | Date |
|---|---|---|
| 579,818 | Germany | July 3, 1933 |

OTHER REFERENCES

Dermer et al., "Journal American Chemical Society," vol. 61 (1939), page 750.